May 29, 1951     F. J. BINDA     2,554,850
HEAT RESISTANT LIGHT-POLARIZING POLYVINYL
BORATE FILM CONTAINING BORAX
Filed June 18, 1948
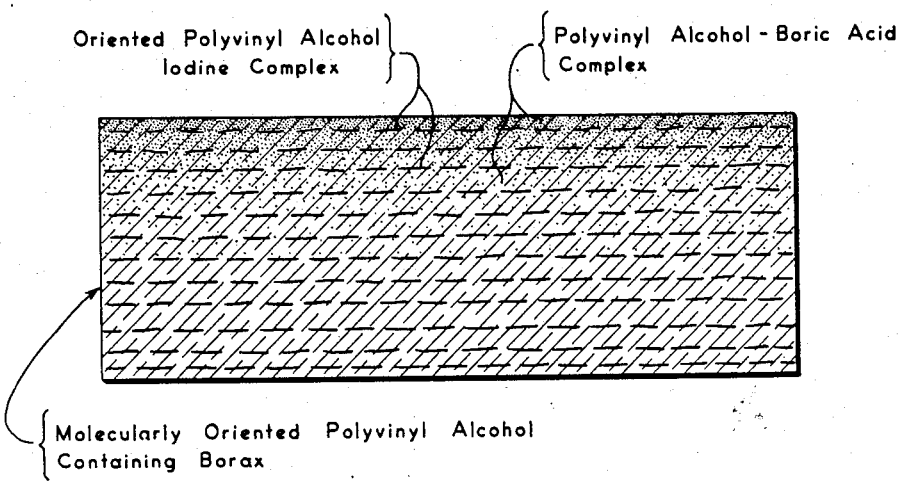
INVENTOR
Frederick J. Binda
BY Donald L. Brown
Attorney Patented May 29, 1951

2,554,850

UNITED STATES PATENT OFFICE 2,554,850

HEAT RESISTANT LIGHT-POLARIZING POLYVINYL BORATE FILM CONTAINING BORAX

Frederick J. Binda, Cambridge, Mass., assignor to Polaroid Corporation, Cambridge, Mass., a corporation of Delaware Application June 18, 1948, Serial No. 33,910

4 Claims. (Cl. 88—65)

This invention relates to a new and improved light-polarizing material and more specifically to an improved light-polarizing sheet or film of the type described in Patent No. 2,237,567, issued April 8, 1941, to Edwin H. Land.

An object of the invention is to provide a light-polarizing sheet or film comprising a molecularly oriented polyvinyl compound having incorporated therewith a dichroic complex of iodine and said polyvinyl compound, and stabilized against moisture, ultraviolet radiation and heat.

More specifically it is an object of the invention to provide such a light-polarizing sheet having incorporated therewith a complex of boric acid and the polyvinyl compound comprising the sheet, and a further buffer material from the class consisting of the sodium and potassium borates, the boric acid-polyvinyl compound complex serving essentially to render the sheet moisture-resistant and the borate serving essentially to render the sheet stable to prolonged exposure at relatively high temperatures.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a further understanding of the invention reference should be had to the following description taken in connection with the accompanying drawing which is a diagrammatic enlarged sectional view of a light-polarizing sheet embodying the invention.

A preferred light polarizer for many uses is that shown and described in United States Letters Patent No. 2,237,567. This polarizer comprises a sheet or film of polyvinyl alcohol which has been stretched or otherwise extended to orient the molecules thereof to substantial parallelism and which has been dyed or stained with a solution comprising iodine to form in the sheet an oriented dichroic complex of iodine on solid polyvinyl alcohol. Such a polarizer is highly efficient and easy to manufacture. It has, however, shown a tendency to deteriorate when subjected to moisture or to heat, the iodine stain being rather readily driven from the sheet unless stabilized therein. In the copending application of Hyman and West, Serial No. 576,850, filed February 8, 1945, for "Sheetlike Light-Polarizing Complex of Iodine and a Polyvinyl Compound with Protective Surface Boric Acid-Polyvinyl Compound Complex" (now Patent No. 2,445,579, issued July 20, 1948, and reissued as No. 23,297 on November 28, 1950), there is disclosed a method of stabilizing the iodine-polyvinyl alcohol complex, especially against the action of moisture. The polarizing sheet or film is, according to the teachings of this copending application, imbibed in a solution of boric acid and thereafter subjected to a heat treatment whereby there is formed in the surface layers of the polarizing film a boric acid-polyvinyl compound complex which is moisture resistant and also heat resistant and which serves to lock or tie in the iodine so that the polarizing sheet is rendered more stable to the action of moisture and heat. It has been found, however, that even polarizing films which have been treated in the manner suggested by Hyman and West to have incorporated therein surface layers of a boric acid-polyvinyl alcohol complex, show discoloration when subjected to protracted exposure to temperatures in the neighborhood of 120° F. This discoloration is in all probability due to the formation within the polarizing sheet or film of a dehydrated dichroic polyvinyl alcohol compound which has become known as polyvinylene. This compound is formed by protracted exposure to temperatures in excess of 120° F. or by a shortened exposure to still higher temperatures, the iodine in the sheet acting, it is believed, as a catalyst in the formation of the polyvinylene. The protracted exposure of the boric acid treated sheet to temperatures of the order specified results not only in a darkening of the sheet through the formation therein of polyvinylene but in a diminution of the iodine content of the sheet with a corresponding impairment of its polarizing properties.

It is a principal object of this invention to provide a light-polarizing sheet of the general character described which has incorporated therein a buffer or inhibitor which resists the formation of polyvinylene when the sheet is exposed for protracted periods to high temperatures. Materials which have been found effective in preventing the formation of the undesirable dehydration product are the sodium and potassium borates, and of these the preferred material is borax or sodium tetraborate.

While the following examples relate primarily to polarizing sheets comprising complexes of iodine on molecularly oriented polyvinyl alcohol, it is to be understood that the invention contemplates the use of molecularly oriented carriers other than polyvinyl alcohol. The carrier sheet may comprise any hydroxylated linear high polymer or derivative thereof, or any compound which can be converted into a hydroxylated linear high polymer, and specifically the invention contemplates the use of polyvinyl alcohol, the polyvinyl acetals, the polyvinyl ketals and the polyhydroxy alkanes as materials from which the molecularly oriented sheet or film may be formed. The light polarizer of the present invention, therefore, may be said to comprise a dichroic sorption complex of iodine on a molecularly oriented polyvinyl compound of the class described.

This molecularly oriented dichroic sorption complex is then imbibed in, or brought in contact with, a bath or solution, or a series of solutions comprising boric acid and either sodium or potassium hydroxide, or a substance from the class consisting of the sodium and potassium borates, preferably borax. The concentration of boric acid and borax or other borate in the solution or solutions to which the oriented polarizing sheet is subjected are not critical. Preferably the boric acid is present in higher concentration is the borax or other borate, and a preferred concentration comprises 9% by weight of boric acid and 2% by weight of borax. Other satisfactory concentrations, however, may include solutions of a boric acid concentration of 16% by weight or even higher and a borax concentration of about 6% by weight, or solutions having concentrations of 9% by weight of boric acid and 1% by weight of borax or other variations within the ranges indicated. Preferably the solutions should contain from 1% to 6% by weight of borax and from about 5% to about 20% by weight of boric acid. The polarizing sheets or films are imbibed in these solutions for a period of about one-half minute or slightly longer with the temperature of the solutions preferably maintained at about 60° C.

As an example illustrative of the practice of the invention, a light-polarizing sheet was made by imbibing a sheet of molecularly oriented polyvinyl alcohol in a solution comprising 8½ grams of iodine, 100 grams of potassium iodide, and water to make 1000 cc. at a temperature of about 33° C. The imbibition time was approximately five seconds. The resulting sheet comprised a dichroic sorption complex of iodine on molecularly oriented polyvinyl alcohol and showed excellent polarizing properties. This sheet was then imbibed for thirty-two seconds in a solution comprising 270 grams of boric acid and 60 grams of borax in water to make 2700 cc. The resulting product consisted of a sheet of a light-polarizing complex of iodine on molecularly oriented polyvinyl alcohol, the surfaces at least of which comprised a boric acid-polyvinyl alcohol complex which showed high resistance to moisture. The sheet contained borax in sufficient quantity to prevent the formation within the sheet of any dehydration product of polyvinyl alcohol even after the sheet had been subjected to the light from an intense 100 watt lamp at a temperature slightly in excess of 120° F. for one month continuously.

As a comparative test identical sheets of the oriented light-polarizing iodine complex on solid polyvinyl alcohol were processed, one sheet being imbibed in a 9% solution of boric acid and the other sheet being imbibed in a 9% boric acid and 2% borax solution in the manner described above. The two sheets were then subjected to baking for twenty-four hours at a temperature of 250° F. Each sheet, before the heat treatment, showed a transmission for the desired component of incident light of approximately 35% and a transmission for the undesired component, i. e., the component which is blocked by the polarizing sheet, of approximately 0.005%. After heat treatment the sheet containing the boric acid and borax showed a transmission for the desired component of 38.5%, i. e., an increase of slightly more than 3%, and a transmission for the undesired component of 0.03% or an increase of about 0.025%. This sheet was still a highly efficient, satisfactory polarizer. It had bleached slightly but had shown no darkening. The other sheet which had been subjected only to the boric acid treatment showed, after heat treatment, a transmission for the desired component of only 15.5%, i. e., a loss of about 20%. Its transmission for the undesired component remained unchanged. This darkening of the sheet, its loss of transmission for the desired component, was due to the formation in the sheet of polyvinylene, the dehydration product of polyvinyl alcohol.

The incorporation of the borax in the sheet appeared not to affect the resistance of the sheet to moisture. Sheets of the light-polarizing material having borax incorporated therein, when exposed to the ultraviolet arc of 100 hours in a comparative test with sheets containing boric acid but no borax, showed a slightly improved transmission of the desired component with substantially no change in transmission of the undesired component, whereas the sheets containing only boric acid showed a slight decrease in the transmission of the desired component with a slight but appreciable darkening. Sheets containing boric acid and borax were subjected to rapidly changing temperature, from a high of 150° F. to a low of −50° F. and this cycle was repeated for ten cycles. The sheets showed no change in the transmission properties for either the desired or undesired components of the incident light.

While the tests referred to relate to sheets which had been imbibed in solutions containing 9% by weight of boric acid and 2% by weight of borax, comparable and wholly satisfactory results were obtained when the sheets were imbibed in solutions containing 15% by weight of boric acid and 5.8% by weight of borax, and where the sheets were imbibed in solutions containing 9% by weight of boric acid and 1% by weight of borax. An excessive amount of borax in the solution in which the sheet is imbibed may result in a slight bleaching of the sheet but this result is not obtained if the boric acid concentration is maintained no greater than 6% by weight.

In lieu of borax the sheet may be imbibed in solutions of boric acid and either sodium or potassium borate, or the sheet, after having first been treated with the boric acid solution, may be subjected to treatment by a solution of sodium or potassium hydroxide to form within the sheet the corresponding borate. Either the sodium or potassium borate appears to function within the sheet satisfactorily to inhibit the formation of polyvinylene in the sheet when heated.

The product of the present invention has been successfully used as a light-polarizing filter in connection with display devices, such as advertising signs and the like, where the filter is positioned closely adjacent a relatively intense source of illumination which remains lighted continuously for long periods, for example for as much as six hundred or seven hundred hours. Under these circumstances the polarizing filter may be subjected to temperatures in the neighborhood of 125° F. or even higher for protracted periods. The polarizer of the present invention, i. e., the polarizing sheet containing the boric acid polyvinyl compound complex and containing the heat stabilizing borate withstands these conditions perfectly. It shows no loss in polarizing properties, no discoloration, and no darkening after such protracted exposure to heat.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A light polarizer comprising a molecularly oriented sheet of a polyvinyl compound from the class consisting of the polyvinyl alcohols, polyvinyl acetals and polyvinyl ketals, said sheet containing, adjacent at least one surface thereof, a substance from the class consisting of the sodium and potassium borates, the said portion of said sheet comprising essentially a heat- and moisture-resistant complex of boric acid, said borate and said polyvinyl compound and having incorporated therein a molecularly oriented dichroic, transparent sorption complex of iodine, the presence in said sheet of said borate and the said complex thereof improving the stability of said sheet to protracted exposure to high temperatures.

2. The product of claim 1 wherein a portion of the sheet which comprises a complex of boric acid and the said polyvinyl compound contains borax.

3. The product of claim 1 wherein the polyvinyl compound is polyvinyl alcohol.

4. The product of claim 1 wherein the polyvinyl compound is polyvinyl alcohol, and the added borate is borax.

FREDERICK J. BINDA.

REFERENCES CITED

The following references are of record in the file of this patent:

UNITED STATES PATENTS

| Number | Name | Date |
| --- | --- | --- |
| 2,072,302 | Herrmann | Mar. 2, 1937 |
| 2,162,618 | Izard | June 13, 1939 |
| 2,173,304 | Land et al. | Sept. 19, 1939 |
| 2,237,567 | Land | Apr. 8, 1941 |
| 2,326,539 | Irany | Aug. 10, 1943 |
| 2,444,712 | Signaigo | July 6, 1948 |